P. C. DE GROOT.
DEVICE FOR SHARPENING THE ROTARY CIRCULAR KNIVES OF MEAT SLICING MACHINES.
APPLICATION FILED SEPT. 16, 1912.
1,051,734.
Patented Jan. 28, 1913.
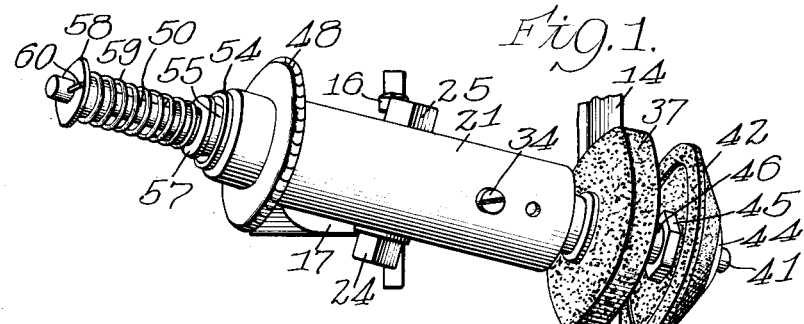
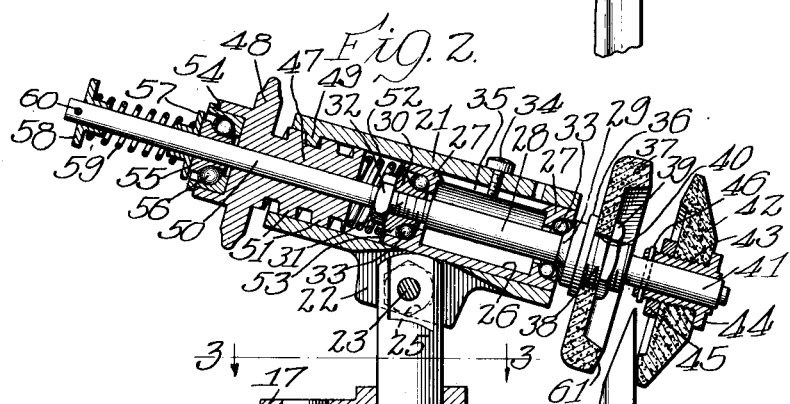
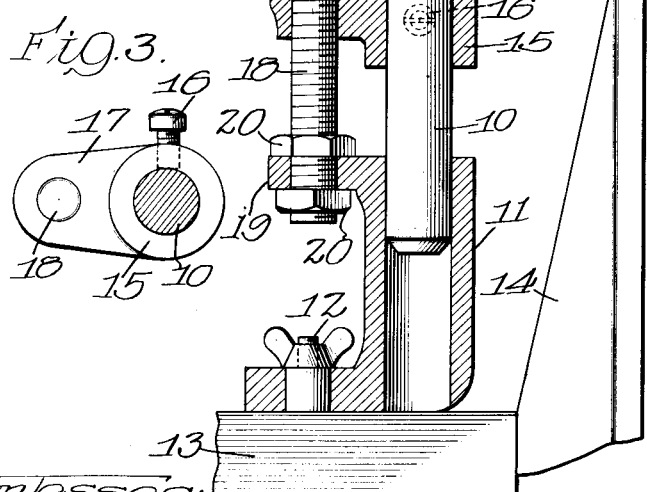
Witnesses:
Inventor:
Pieter C. de Groot
By: J. H. Jochum, Jr.
Atty.

UNITED STATES PATENT OFFICE.

PIETER C. DE GROOT, OF ROTTERDAM, NETHERLANDS, ASSIGNOR TO U. S. SLICING MACHINE COMPANY, OF CHICAGO, ILLINOIS, A CORPORATION OF ILLINOIS.

DEVICE FOR SHARPENING THE ROTARY CIRCULAR KNIVES OF MEAT-SLICING MACHINES.

1,051,734.      Specification of Letters Patent.      Patented Jan. 28, 1913.

Application filed September 16, 1912. Serial No. 720,448.

*To all whom it may concern:*

Be it known that I, PIETER C. DE GROOT, a subject of the Ruler of the Netherlands, residing in Rotterdam, in the Kingdom of the Netherlands, have invented certain new and useful Improvements in Devices for Sharpening the Rotary Circular Knives of Meat-Slicing Machines, of which the following is a specification.

This invention relates to improvements in devices for sharpening the rotary circular knives of meat slicing machines, and has for its primary object to provide an improved device of this class by means of which the knife may be readily sharpened, and when not in use, may be thrown out of operation by a comparatively slight adjustment, or removed entirely from the machine, and which sharpening device embodies rotary sharpeners adapted to engage opposite faces of the knife.

A further object is to provide an improved device of this class which will be simple, durable and cheap in construction and effective and efficient in operation.

To the attainment of these ends and the accomplishment of other new and useful objects as will appear, the invention consists in the features of novelty in substantially the construction, combination and arrangement of several parts hereinafter more fully described and claimed, and shown in the accompanying drawing exemplifying the invention and in which—

Figure 1 is a top plan view of an improved device of this class, constructed in accordance with the principles in this invention. Fig. 2 is a vertical sectional view of the device shown in Fig. 1. Fig. 3 is a detail sectional view taken on line 3—3, Fig. 2.

The rotary circular knife of a meat slicing machine, of the type with which the present invention is adapted to be used is provided on one face with a beveled portion, and this beveled portion is arranged away from the meat being cut, that is to say, the face of the knife which is not beveled is arranged adjacent to the meat. In sharpening these knives, they should be sharpened to a greater extent on one side than on the other, that is, the beveled face of the knife should be sharpened to a greater extent, while the other face of the knife does not require any great amount of sharpening, but it is only necessary to sharpen this latter side of the knife a sufficient extent to remove the bur or wire edge which is formed by sharpening the beveled face. It has been found in practice that better results can be obtained if the grinder which is on the side of the knife opposite to the side on which the bevel is formed, is not brought into action until after the beveled face has been sharpened or ground, as a very slight grinding will remove the wire edge thus formed.

In the present form of the invention the grinders are fixed with relation to each other and are so arranged that a portion of the knife will always stand between the grinders or sharpeners, and controlling means is provided which is common to both of the grinders for manipulating or adjusting the grinders to position them with relation to the respective faces of the knife and with comparatively slight adjustment. The form of the invention best adapted for these operations and which is exemplified in the drawing comprises a supporting member or stem designated generally by the reference numeral 10, which may be constructed of any suitable material and of any desired size, and upon which stem the grinding disks or wheels hereinafter to be described, are mounted. The stem 10 has an adjustable engagement with a bracket 11, and which bracket is removably secured by means of a suitable fastening device 12 to a fixed portion 13 of the machine, of which the rotary knife 14 is a portion. A collar 15 is mounted loosely upon the stem 12 and is secured to the stem by means of a suitable fastening device 16. This collar is provided with a projecting portion 17, to which is secured a depending screw threaded member 18,—the latter passing loosely through a portion 19 of the bracket 11, so that the stem 10 may be adjusted vertically with respect to the bracket. Nuts or collars 20, are threaded on to the portion 18 on opposite sides of the portion 19 of the bracket and serve as a means whereby the adjustment of the stem vertically with respect to the bracket 11 may be obtained, and also serve as a means for holding the stem in its adjusted position.

The casing 21, is mounted upon the stem 10 and is provided with spaced projecting portions 22, one only of which is shown in Fig. two (2,) between which spaced portions the end of the stem 10 projects. The casing is preferably tubular and extends transversely with respect to the stem and is pivotally connected to the stem by means of a pivot pin 23 extending through the portions 22 and the end of the stem. This pivot pin 23 is preferably in the form of a bolt, having a head 24 on one end and a nut 25 on the other end, by means of which the casing may be held in its adjusted position.

Slidably mounted within the casing 21 is a bearing sleeve 26, having ball races 27 and a spindle 28 passes through the sleeve and is provided with bearing portions 29 and 30, coöperating with the ball races and the bearing portion 30 is preferably removably secured to the spindle 28 by being threaded on to the portion 31 thereof and a lock nut 32 is provided for holding portion 30 against displacement. The balls 33 are arranged in the races thus formed and have engagement with the bearing portions 29 and 30. This sleeve 26 is held against rotation in the casing 21 in any desired or suitable manner, preferably by means of a fastening device screw or bolt 34 which passes through the casing 21 and into the slot 35 in the bearing sleeve, and the slot is preferably of some length so as to permit the bearing sleeve 26 together with the spindle 28 to be adjusted longitudinally with respect to the casing 21. The forward end of the spindle 18 projects beyond the sleeve and the casing is provided with a shoulder against which the grinding wheel 37 rests. This wheel is provided with an aperture to receive the end 38 of the spindle and which end is preferably screw threaded for the reception of a nut or collar 39 by means of which the grinder 37 may be clamped against the shoulder 36 and thereby lock or secure the grinder to the spindle for rotation therewith.

In order to prevent the grinder from being crushed by the adjustment of the collar 39, an annular member 40, preferably constructed of metal, is provided and is placed in the aperture in the grinder so as to surround the portion 38 of the spindle. This member is of a size that the collar or nut 39 together with the shoulder 36 will have engagement with the ends of the member. The spindle 28 projects for some distance beyond the threaded portion 38 and is reduced as at 41. The grinder 42 for the other side of the knife 14 is also provided with an aperture therethrough and a bushing 43 extends through this aperture. This bushing is of a size to substantially fill the aperture and is provided on its exterior with a shoulder 44 adjacent one end which is adapted to engage and rest against one face of the grinder 42. The bushing is of a length somewhat greater than the thickness of the grinder so that a nut or collar 45 may be threaded thereon to coöperate with the shoulder 44 and thereby clamp the grinder 42 to the bushing. This bushing 43 is sleeved upon the reduced extremity 41 of the spindle 28 and is secured to the spindle for rotation therewith in any desired or suitable manner, preferably by means of a fastening pin 46, which passes through the portion of the bushing and also through the spindle. When the grinders 37 and 42 are thus secured to the spindle they will be fixed with relation to each other and will also be spaced from each other, to permit a portion of the cutting edge of the knife 14 to stand in the space between the grinders at all times when the grinders are in position on the machines. Furthermore, it will be noted that the grinders are preferably angularly disposed to a horizontal plane and are rotated by the frictional engagement of the knife therewith and being mounted upon the same spindle and both being secured to the spindle for rotation therewith, they will both rotate simultaneously when the knife is in engagement with either one or the other of the grinders. The grinders will thus have adjacent portions arranged substantially parallel to properly position them. It will also be manifest that only one of the grinders can be brought into engagement with a knife at a time and when one of the grinders is in engagement with the knife, the other will be out of engagement.

The grinders are spaced from each other a sufficient distance to permit them to be positioned out of engagement with the knife so that the knife will rotate free thereof, but either of the grinders may be brought into engagement with the respective faces of the knife by a comparatively slight adjustment of the spindle longitudinally of the casing 21. A single controlling means is provided with the present invention for thus adjusting both of the grinders and comprises in the present exemplification of this invention a sleeve 47 to which is secured a hand wheel 48. The casing 21 is preferably of a length somewhat greater than the length of the sleeve 26, and is provided with an interior projecting lug 49 preferably located adjacent the extremity of the casing removed from the extremity adjacent which the grinders are located. The sleeve 47 is loosely supported upon the end 50 of the spindle 28, which forms a continuation or extension of the spindle, this extension is of such a length as to project from some distance beyond the end of the casing 21 and also beyond the end of the sleeve 47 through which it loosely passes. The sleeve 47 is provided with exterior screw threads 51 between which threads the projection 49 extends. The sleeve 47 terminates short of the end of the sleeve 26 and disposed between the adjacent ends of these sleeves so as to have a bearing against both, is an elastic member 52, preferably in the form of a coil spring which tends normally to move the spindle 28 in a direction to move the grinder 37 in engagement with the bevel face of the knife 14. A washer 53 may be provided between the end of the elastic member and the sleeve 26 if desired. The end of the sleeve 47 exterior of the casing 21 is provided with a recess within which is arranged the ball race 54 and a bearing 55 is loosely mounted upon the extension 50 of the spindle which coöperates with the race to form bearings for the ball 56. A collar 57 is sleeved upon the extension 50 of the spindle 28 and rests against the bearing 55 while another collar 58 is spaced from the collar 57 and is also sleeved upon the extension 50. An elastic member 59 is disposed between and bears against these collars and tends normally to move the grinder 42 into engagement with the other face of the knife. The collar 58 is held against displacement with respect to the spindle by means of a suitable fastening pin 60 passing through the spindle beyond the collar and against which the collar rests. These elastic members 52 and 59 also form cushions by means of which the pressure against the respective faces of the knife may be regulated.

With this improved construction it would be manifest that by the adjustment of the hand wheel 48 in one direction or the other, either one of the grinders 37—42 may move into engagement with the respective faces of the knife according to the direction of adjustment of the hand wheel 48. When the wheel is adjusted to move the grinder 37 in engagement with the beveled face, the bearing sleeve 26 will be moved forwardly in the casing 21 by the pressure or stress exerted upon the elastic member 52 as will be understood. When it is desired to move the grinder 37 out of engagement with the knife and to move the grinder 42 into engagement with its face of the knife, the hand wheel 48 is adjusted in the opposite direction by rotating it. This will relieve the stress upon the elastic member 42 and will create a stress upon the elastic member 59 which will move the spindle 28 and bearing sleeve 26 longitudinally in the casing 21, as will be understood. When it is desired to allow the sharpening device to remain upon the machine and yet hold the grinders out of engagement with the knife, the grinders may be adjusted in a manner to cause both of them to stand out of engagement with the respective faces of the knife so that the knife will rotate freely therebetween. Obviously, the grinders will be rotated by the frictional engagement of the knife therewith. It will be noted that the casing 26 is arranged at an angle to the horizontal and also at an angle of approximately 105 degrees to the plane of the vertical face of the knife so that the grinder which acts upon the beveled face may be properly positioned to effectively grind such face.

The entire grinding device may be adjusted vertical with respect to the knife in the manner already described, to wit: by means of the threaded spindle 18.

In order that the grinders may be adjusted rotatably to the proper position with respect to the knife, all that is necessary is to release the fastening device 16 and then rotate the stem 10 in the collar 15 to the desired extent, after which the fastening device 16 may be again tightened. Further adjustment of the grinders may also be obtained by releasing the fastening nut or collar 25 and swinging the casing 21 about the pivot pin 23.

Obviously, the active faces of the grinders are disposed at an angle with respect to the remaining portions of the face of the grinder so as to properly engage the knife. With the improved sharpener it is possible to grind a bevel to the knife with an angle of any size desired and this is rendered possible by the provision of grinders 37, the grinding face 61 of which is provided with a greater or similar angle of inclination according to the angle of the bevel it is desired to obtain.

The specific construction of the grinding wheels and the manner of preventing the grinders from being crushed by the adjustment of the securing means, forms no part of the present application, but constitutes the subject matter of a separate application, and are only thus fully described for a full and clear understanding of their operation.

While there has been shown and described the preferred form of this invention, it is to be understood that various changes may be made in the details of construction and arrangement of the parts within the scope of the claims without departing from the spirit of the invention.

What is claimed as new is:

1. In a sharpening device of the class described, the combination of a sharpener for acting on each side of the knife, and means for moving the sharpeners to cause one of the sharpeners to move away from, while the other sharpener is moved toward the respective faces of the knife.

2. In a sharpening device of the class described the combination of a rotary sharpener for acting on each side of the knife, said sharpeners being rotatable by the engagement of the knife therewith, said sharpeners being movable into and out of engagement with the respective faces of the knife, and means for causing one of the sharpeners to move away from its respective face of the knife when the other sharpener is moved toward its face of the knife.

3. In a sharpening device of the class described, the combination of a rotary sharpener for acting on each side of the knife, said sharpeners being rotatable about a common axis, and being movable into and out of engagement with the respective faces of the knife, and means for causing one of the sharpeners to move away from its respective face of the knife when the other sharpener is moved toward its face of the knife.

4. In a sharpening device of the class described, the combination of a rotary sharpener for acting on each side of the knife, said sharpeners having coinciding axes of rotation and being movable into and out of engagement with the respective faces of the knife, and means for causing the sharpeners to move in the same direction and in such a manner that when one of the sharpeners moves toward its respective face of the knife, the other sharpener will move away from its face of the knife.

5. In a device for sharpening the knife of a slicing machine, the combination of a sharpener for the face of the knife, a sharpener for the back of the knife, said sharpeners being arranged substantially in alinement fixed with respect to each other, and means for moving the sharpeners into engagement with the respective faces of the knife.

6. In a device for sharpening the knife of a slicing machine, the combination of a rotary sharpener for the face of the knife, a rotary sharpener for the back of the knife, said sharpeners having adjacent portions substantially parallel and being spaced from and fixed with respect to each other to permit the knife to move therebetween, said sharpeners being rotated by the engagement of the knife therewith, and means for moving the sharpeners into and out of engagement with the respective faces of the knife.

7. In a device for sharpening the knife of a slicing machine, the combination of a rotary sharpener for the front of the knife, a rotary sharpener for the back of the knife, said sharpeners being rotatable about the same axis, and means for moving the sharpeners into engagement with their respective faces of the knife.

8. In a device for sharpening the knife of a slicing machine, the combination of a rotary sharpener for the front of the knife, a rotary sharpener for the back of the knife, said sharpeners being spaced from and fixed with respect to each other and having coinciding axes of rotation, and means for moving the sharpeners into engagement with the respective faces of the knife.

9. In a device for sharpening the knife of a slicing machine, the combination of a rotary sharpener for the front of the knife, a rotary sharpener for the back of the knife, said sharpeners being fixed with relation to and spaced from each other whereby the knife may move therebetween, said sharpeners being rotatable about the same axis and by the engagement of the knife therewith, and means for moving the sharpeners into engagement with the respective faces of the knife alternately.

10. In a device for sharpening the knife of a slicing machine, the combination of a rotary sharpener for the front of the knife, a rotary sharpener for the back of the knife, said sharpeners being spaced from and fixed with relation to each other whereby the knife may move therebetween, the said sharpeners being also rotatable about a common axis and by the engagement of the knife therewith, and means common to both of the sharpeners for moving them laterally into engagement with the respective faces of the knife.

11. In a device for sharpening the knife of a slicing machine, the combination of two sharpeners spaced laterally and fixed with respect to each other, one of the sharpeners being adapted to act on one face of the knife and the other being adapted to act on the other face of the knife; and means common to the sharpeners for moving them into engagement with the respective faces of the knife, said sharpeners being arranged in angular position with relation to a horizontal plane.

12. In a device for sharpening the knife of a slicing machine, the combination of two sharpeners spaced laterally from and fixed with respect to each other, the axes of the sharpeners being in alinement, one of the sharpeners standing on one side and the other standing on the other side of the knife, said sharpeners being rotatable about the said axes, and means for simultaneously moving the sharpeners to cause them to move laterally with relation to the respective faces of the knife.

13. In a device for sharpening the knife of a slicing machine, the combination of two rotatable sharpeners spaced laterally from and fixed with relation to each other, the axes of the sharpeners being in longitudinal alinement, one of the sharpeners standing on one side and the other standing on the other side of the knife, said sharpeners being rotatable by the engagement of the knife therewith, and means for moving the sharpeners to cause them to be simultaneously moved laterally with relation to the respective faces of the knife.

14. In a device for sharpening the knife of a slicing machine the combination of two rotatable sharpeners spaced laterally from and fixed with relation to each other for simultaneous rotation, said sharpeners having adjacent portions substantially parallel, one of the sharpeners standing entirely on one side of the knife, and the other standing entirely on the other side of the knife, said sharpeners being rotatable by the engagement of the knife therewith, and means for simultaneously moving the sharpeners laterally with relation to the respective faces of the knife.

15. In a sharpening device of the class described, the combination of a sharpener for each side of the knife, a rotatable spindle to which both sharpeners are connected, a bearing for the spindle, and means for shifting the spindle longitudinally with respect to its bearing for moving one of the sharpeners toward and the other sharpener away from the respective faces of the knife.

16. In a sharpening device of the class described, the combination of a sharpener for each side of the knife, a rotatable spindle to which both sharpeners are connected, a bearing for the spindle and means for shifting the spindle in its bearing for moving one of the sharpeners toward and the other sharpener away from the respective faces of the knife, the last said means embodying an elastic element.

17. In a sharpening device of the class described, the combination of a sharpener for each side of the knife and movable alternately into and out of engagement with the respective faces of the knife and simultaneously in the same direction, and means for causing such movement, the said means embodying a controlling element and elastic means disposed between the said element and the sharpeners.

18. In a sharpening device of the class described, the combination of a sharpener for each side of the knife, said sharpeners being movable into and out of engagement with the respective faces of the knife, and means for causing one of the sharpeners to be moved away from its respective face of the knife when the other sharpener is moved toward its face of the knife, the said means embodying a controlling element and elastic elements coöperating with and separated by the said controlling element.

19. In a sharpening device of the class described, the combination of a sharpener for each side of the knife, said sharpeners being movable into and out of engagement with the respective faces of the knife, and means for causing one of the sharpeners to be moved away from its respective face of the knife when the other sharpener is moved toward its face of the knife, the said means embodying a spindle connected with the sharpeners, a controlling element and elastic means disposed between the said controlling element and the spindle.

20. In a sharpening device of the class described, the combination of a sharpener for each side of the knife, said sharpeners being movable into and out of engagement with the respective faces of the knife, and means for causing one of the sharpeners to be moved away from its respective face of the knife when the other sharpener is moved toward its face of the knife, the said means embodying a rotatable spindle to which both of the sharpeners are connected, a controlling element and a plurality of elastic elements disposed between the said spindle and the element, one of said elastic elements coöperating with the controlling element to move the spindle and the sharpeners in one direction when the controlling element is moved in one direction and the other elastic element coöperating with the controlling element to move the spindle and the sharpeners in another direction when the controlling element is moved in another direction.

21. In a sharpening device of the class described, the combination of a sharpener for each side of the knife and rotatable about a common axis, said sharpeners being fixed with respect to each other, one of the sharpeners being movable away from its face of the knife when the other sharpener is moved toward its face of the knife, and means causing such movements of the sharpeners, said means embodying a spindle connected with the sharpeners, a controlling element, and elastic elements disposed between the controlling element, and the spindle, one of the said elastic elements coöperating with the controlling element to move the sharpeners when the controlling element is moved in one direction, and the other elastic element coöperating with the controlling element to move the sharpeners in the opposite direction when the controlling element is moved in another direction.

22. In a sharpening device of the class described, the combination of two sharpeners one for each side of the knife, a spindle to which the sharpeners are connected, said sharpeners being spaced from and fixed with relation to each other, a controlling element, and elastic elements separated by the controlling element and disposed between the latter and the spindle, said elastic elements coöperating with the controlling element for causing the sharpeners to be alternately moved into and out of engagement with the respective faces of the knife.

23. In a sharpening device of the class described, the combination of two sharpeners connected with a common spindle and spaced from each other longitudinally of the spindle and fixed with relation to each other, and means for shifting the spindle to move the sharpeners alternately into engagement with the respective faces of the knife.

24. In a sharpening device of the class described, the combination of two sharpeners one for each face of the knife, said sharpeners being alternately movable into and out of engagement with the respective faces of the knife and means whereby the movement of one of the sharpeners toward its face of the knife will cause the other sharpener to move away from its respective face of the knife.

25. In a sharpening device of the class described, the combination of two sharpeners connected with a common spindle and spaced from each other longitudinally of the spindle and fixed with relation to each other, said sharpeners being angularly disposed with relation to a horizontal plane, and means for shifting the spindle to move the sharpeners alternately into engagement with the respective faces of the knife.

26. In a sharpening device of the class described, the combination of a sharpener for acting on each side of the knife, and means for moving the sharpeners to cause one of the sharpeners to move away from, while the other sharpener is moved toward the respective faces of the knife, both of said sharpeners being arranged in an angular position with relation to a horizontal plane.

27. An attachment for slicing machines comprising a sharpening device embodying a sharpener for acting on each side of the knife, and means for moving the sharpeners to cause one of the sharpeners to move away from while the other sharpener is moved toward the respective faces of the knife, said attachment being adjustably and detachably connected with the machine.

In testimony whereof I have signed my name to this specification in the presence of two witnesses this 2d day of September, 1912.

PIETER C. DE GROOT.

Witnesses:
JAN J. VAN REUGEL,
FRANZ PRENGEL.